United States Patent [19]

Arensmeier et al.

[11] Patent Number: 4,827,397
[45] Date of Patent: May 2, 1989

[54] MICROCOMPUTER-BASED SPARK IGNITION GAS BURNER CONTROL SYSTEM

[75] Inventors: Jeffrey N. Arensmeier; Robert W. Haul, both of St. Louis, Mo.

[73] Assignee: Emerson Electric Co., St. Louis, Mo.

[21] Appl. No.: 71,811

[22] Filed: Jul. 10, 1987

[51] Int. Cl.$^4$ ............................................. G06F 15/20
[52] U.S. Cl. .................... 364/186; 364/434; 371/4; 371/12
[58] Field of Search ............ 364/184, 186, 434.1, 364/434.11, 434.12; 371/4, 64, 12

[56] References Cited

U.S. PATENT DOCUMENTS

| | | | |
|---|---|---|---|
| 4,270,202 | 5/1981 | Shittard et al. | 370/80 |
| 4,455,652 | 6/1984 | Van der Meulen | 364/184 |
| 4,518,345 | 5/1985 | Mueller et al. | 431/24 |
| 4,581,697 | 4/1986 | Jameison et al. | 364/431.04 |
| 4,587,655 | 5/1986 | Hirao et al. | 364/431.11 |
| 4,618,953 | 10/1986 | Daniels et al. | 371/62 |
| 4,649,514 | 3/1987 | Berger | 364/900 |
| 4,729,089 | 3/1988 | Bench et al. | 364/184 |

OTHER PUBLICATIONS

"Microprocessors and Programmed Logic," K. Short, ©1981 Prentice Hall, Inc., pp. 274-278.
IBM Tech. Bulletin, "Computer Error Anticipator and Cycle Extender," Hartlipp et al., vol. 11, No. 2, 7/68 p. 212.

Primary Examiner—John R. Lastova
Attorney, Agent, or Firm—Paul A. Becker, Sr.

[57] ABSTRACT

A microcomputer-based spark ignition gas burner control system includes program logic to ensure compatibility of spark ignition and a microcomputer. The program logic provides for periodically re-defining the I/O (input/output) ports so as to negate the adverse effect of any electrical noise generated in the system. The program logic also provides, during ignition, a cyclically re-occurring finite time period during which sparking occurs followed by a finite time period during which flame detect circuit means is enabled. The system further includes a fault-tolerant spark generating circuit to ensure that sparking is inhibited during times that the combustion chamber is being purged of any combustible mixture.

5 Claims, 5 Drawing Sheets

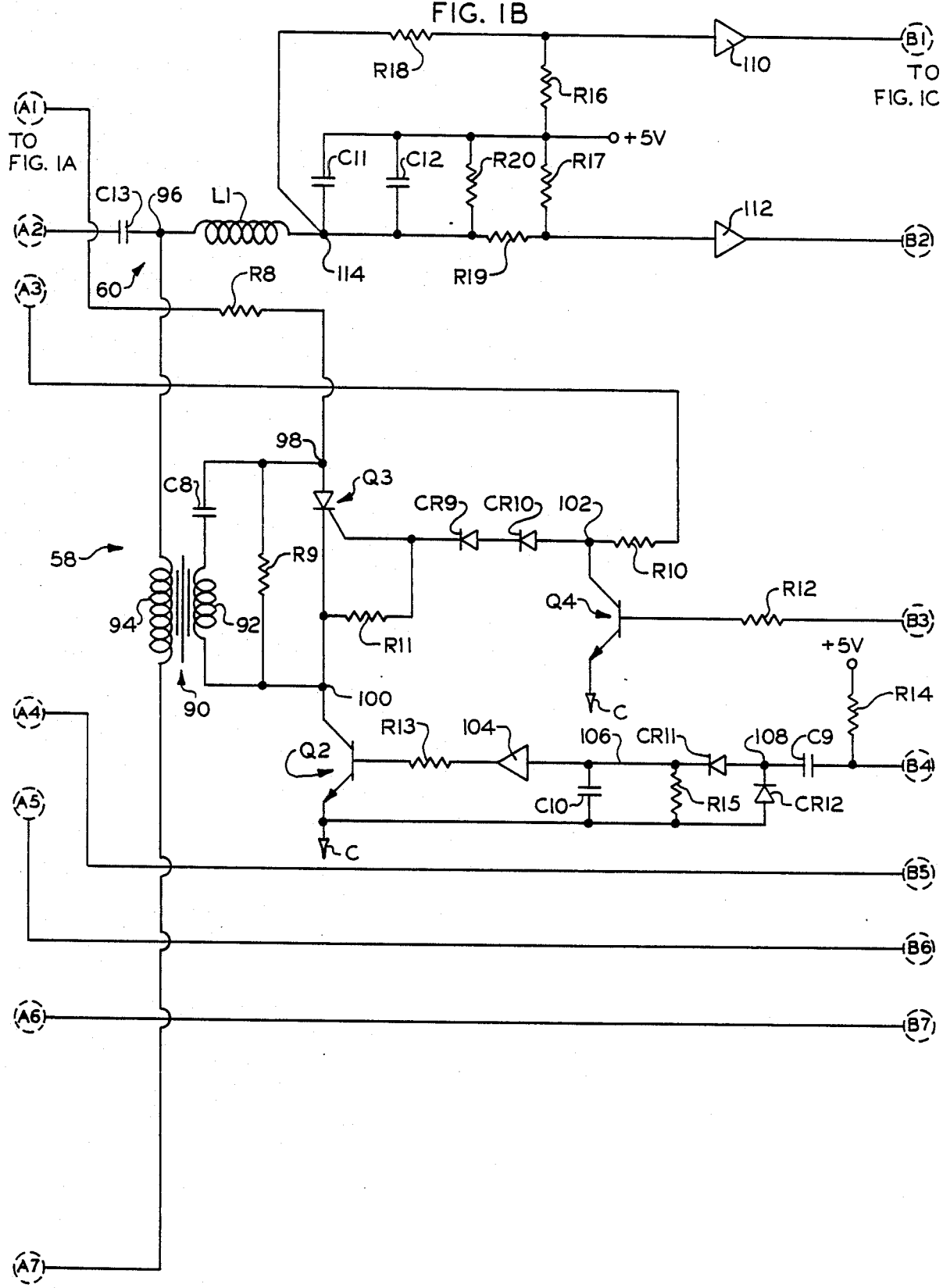

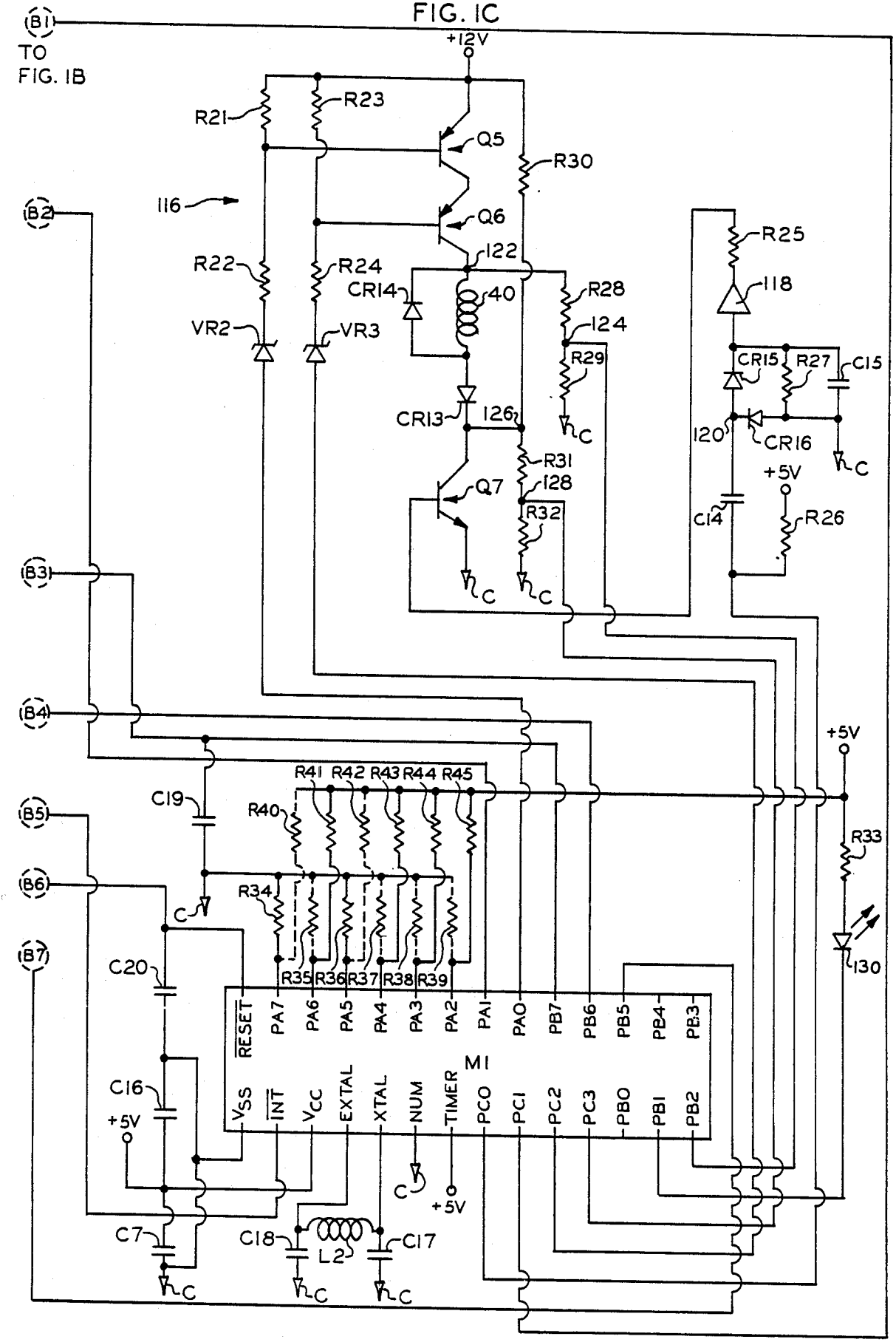
FIG. IC

MICROCOMPUTER-BASED SPARK IGNITION GAS BURNER CONTROL SYSTEM

BACKGROUND OF THE INVENTION

This invention relates to spark ignition gas burner control systems which utilize a microcomputer.

Due to the ever-increasing need for conservation of energy, it has become desirable, and in some cases mandatory, that the conventional standing pilot used in appliances such as furnaces be replaced with some type of interrupted ignition means. Accordingly, there have been developed systems which retain the pilot burner but provide for ignition of the pilot burner only on a call for heat, and systems which eliminate the pilot burner and provide for direct ignition of the main burner. In either system, the ignition means is generally either some type of spark ignition means or some type of hot surface ignition means.

In recent years, many such interrupted-ignition types of gas burner control systems have been developed, and some of them include a microcomputer. An example of a microcomputer-based interrupted-ignition type of gas burner control system, wherein the ignition means is a hot surface igniter, is shown and described in U.S. Pat. No. 4,518,345; an example of a microcomputer-based interrupted-ignition type of gas burner control system, wherein the ignition means is a spark, is shown and described in U.S. Pat. No. 4,581,697.

The microcomputer not only enables a considerable cost savings over discrete electrical components in providing the desired system functions, but also provides improved levels of safety, reliability, and versatility. However, a particular problem exists when using a microcomputer in systems wherein the ignition means is a spark, and more particularly, when the microcomputer and the spark transformer are located in the same physical package.

Specifically, the architecture of a typical microcomputer chip is such that the I/O (input/output) ports can be affected by electrical noise. More specifically, the spark transformer in the spark generating circuit acts as a transmitter of electrical noise, and the electrical leads or pins at the I/O ports of the microcomputer act as receivers of such noise. Such electrical noise can change the port status from its designated status to the opposite status, that is to say, from an input to an output or from an output to an input. Noise can also change the data in the port. Obviously, such changes in status and/or data, if not corrected, could cause erroneous system operation. While various hardware means can be used to reduce the transmission and/or reception of such noise, such hardware means do not ensure that the microcomputer has not been adversely affected.

Another particular concern in interrupted-ignition systems wherein the ignition means is a spark is to ensure that sparking is inhibited at all times when gas is not flowing. For example, it is imperative that sparking be inhibited during the time that the combustion chamber is being purged of any unburned fuel that may have accumulated due to an unsuccessful attempt at ignition.

SUMMARY OF THE INVENTION

It is, therefore, a primary object of this invention to provide a generally new and improved microcomputer-based spark ignition gas burner control system wherein means are provided to ensure compatibility of spark ignition and a microcomputer.

A further object of the invention is to provide a microcomputer-based spark ignition gas burner control system wherein the microcomputer logic provides for re-defining the I/O ports so as to negate the adverse effect of any electrical noise on the microcomputer chip itself. Specifically, a sub-routine is executed periodically to re-define each I/O port and subsequently to read the data from the port when the port is an input port, and to write the data to the port when the port is an output port.

Another object of the invention is to provide a microcomputer-based spark ignition gas burner control system which provides, during ignition, a finite time period during which sparking occurs and flame detect circuit means is inhibited, and a subsequent finite time period during which sparking is inhibited and flame detect circuit means is enabled.

Yet another object of the invention is to provide a spark generating circuit which provides multi-level component fault tolerance so as to ensure that sparking is inhibited during times that the combustion chamber is being purged of any combustible mixture.

The above mentioned and other objects and features of the present invention will become apparent from the following description when read in conjunction with the accompanying drawings.

BRIEF DESCRIPTION OF THE DRAWINGS

FIGS. 1A, 1B, and 1C, when combined, is a diagrammatic illustration of a burner control system constructed in accordance with the present invention;

DESCRIPTION OF THE PREFERRED EMBODIMENT

Figure 1A:
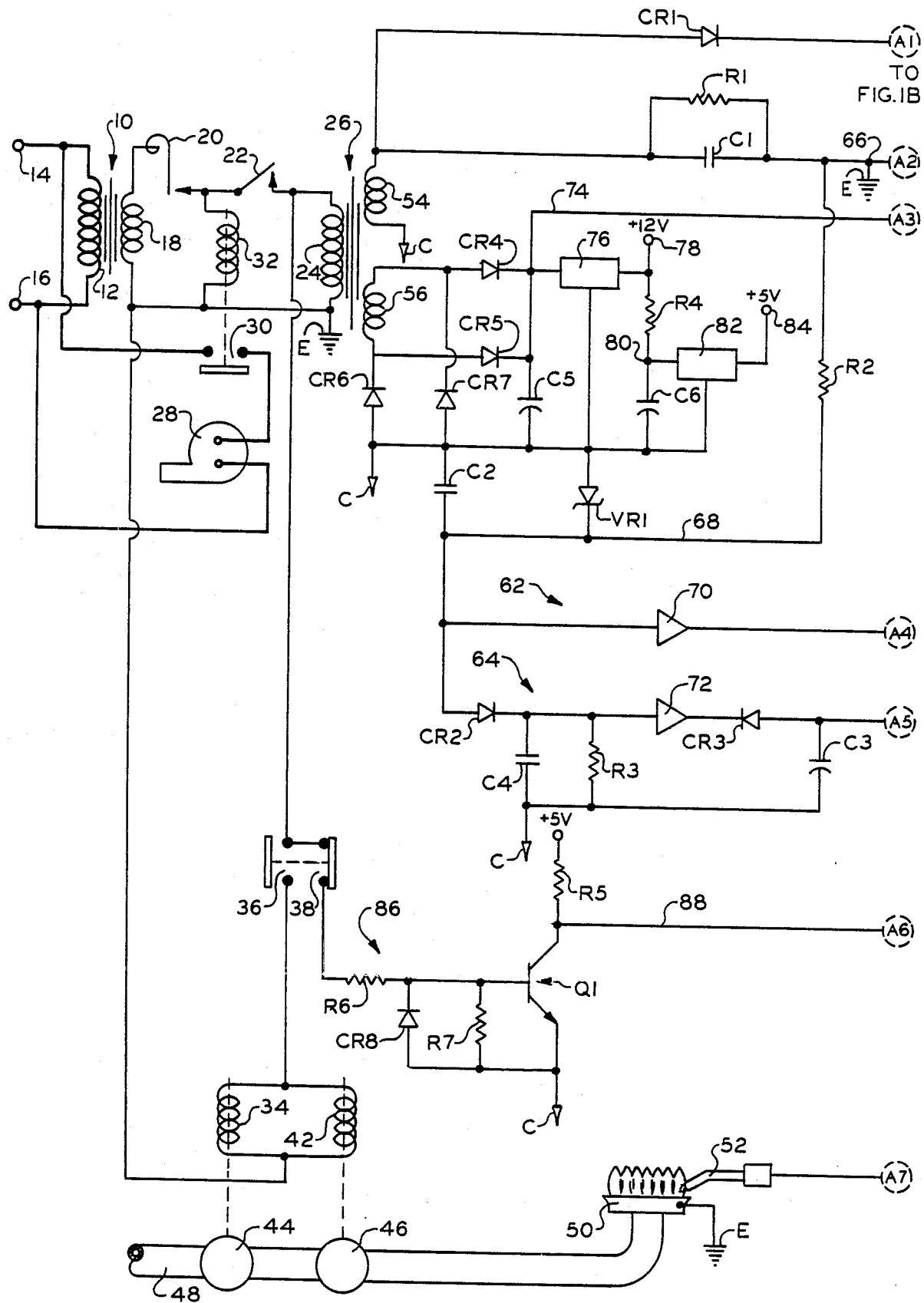

The diagrammatic illustration of the burner control system of the present invention is obtained by placing FIG. 1A to the left of FIG. 1B, and FIG. 1C to the right of FIG. 1B. When so combined, the connecting points A1 through A7 of FIG. 1A are aligned with the connecting points A1 through A7 of FIG. 1B, and connecting points B1 through B7 of FIG. 1B are aligned with the connecting points B1 through B7 of FIG. 1C. It is to be noted that while the illustration is of a direct ignition type of burner control system, the concepts described herein apply also to burner control systems utilizing a pilot burner.

Referring to FIG. 1A, the control system of the present invention includes a voltage step-down transformer 10 having a primary winding 12 connected to terminals 14 and 16 of a conventional 120 volt alternating current power source. The secondary winding 18 of transformer 10 provides a 24 volt alternating current power source and is connected at one end through a thermostat 20 and a pressure switch 22 to one side of the primary winding 24 of an isolation transformer 26. The other end of secondary winding 18 of transformer 10 is connected to the other end of primary winding 24 of transformer 26 and is earth grounded at E.

A fan 28 is connected across power source terminals 14 and 16 through a set of normally-open relay contacts 30. Relay contacts 30 are controlled by a relay winding 32 which is connected across secondary winding 18 of transformer 10 through thermostat 20. Thus, whenever thermostat 20 closes its contacts, fan 28 is energized. When fan 28 is energized, pressure switch 22 senses the flow of air and closes its contacts.

Fan 28 and pressure switch 22 are generally positioned in the flue of a furnace (not shown) so as to be in air-flow communication with the combustion chamber of the furnace. Fan 28 provides the air required for obtaining a combustible air-gas mixture by inducing air into the combustion chamber, and provides a positive means for forcing the products of combustion out of the combustion chamber through the flue. Fan 28 is also selectively energizable before initiation of energizing of the igniter and is always energized between unsuccessful attempts at ignition to purge the combustion chamber of any accumulated unburned fuel or products of combustion. The utilization of fan 28 is required for direct ignition burner control systems in which the combustion chamber is sealed. It is to be understood, however, that there are other systems which can embody the present invention, in which fan 28 is not required and can be omitted.

A first valve winding 34 is connected across secondary winding 18 of transformer 10 through thermostat 20, pressure switch 22, and a set of normally-open relay contacts 36 of a double-throw relay also having a set of normally-closed contacts 38 and, referring to FIG. 1C, a winding 40. A second valve winding 42 is connected in parallel with first valve winding 34.

First valve winding 34 controls a first valve 44, and second valve winding 42 controls a second valve 46. Valves 44 and 46 are connected fluidically in series in a gas conduit 48 leading from a gas source (not shown) to a gas burner 50 which is earth grounded at E. A spark electrode 52, connected to connecting point A7, is positioned near burner 50 to provide sparks for ignition and to provide means for sensing the presence and absence of a burner flame. Both valves 44 and 46 must be open to enable gas to flow to burner 50. It is to be understood that valves 44 and 46 can be separate devices, as illustrated, or a unitary device. Utilization of a redundant valve arrangement, wherein two serially connected valves control the flow of gas to a burner, is well known in the art.

Isolation transformer 26 includes secondary windings 54 and 56. Transformer 26 is preferably a split bobbin design, wherein the earth grounded 24 volt primary winding 24 is wound on one section of the bobbin and secondary windings 54 and 56 are wound on the other section of the bobbin, so as to enhance the elimination of high frequency noise that might otherwise be coupled from the 24 volt primary winding 24 to the remainder of the circuit powered by secondary windings 54 and 56.

Secondary winding 54 has an open circuit voltage of approximately 150 volts. One end of secondary winding 54 is connected to chassis common C. The other end of secondary winding 54 is connected through a rectifier CR1 to connection point A1 so as to provide a half-wave rectified power source to the spark generating circuit shown generally at 58 in FIG. 1B. The end of secondary winding 54 not connected to common C is also connected through a capacitor C1 to connecting point A2 so as to provide coupling of the 150 volt alternating current power source at secondary winding 54 with the flame detent circuit shown generally at 60 in FIG. 1B. Connecting point A2 is earth grounded at E, and capacitor C1 is effective to block any direct current flow between earth ground E and chassis common C. A resistor R1 of sufficiently high resistance so as to also effectively block direct current flow, is connected in parallel with capacitor C1. Resistor R1 also functions as a bleed resistor for capacitor C1.

Capacitor C1 also couples the power source at secondary winding 54 with a 60 Hz square wave circuit 62 and a reset circuit 64. Specifically, a resistor R2 is connected at one end to a junction 66 between capacitor C1 and connecting point A2, and at its other end to a lead 68. A capacitor C2 is connected between lead 68 and common C to filter any noise from the 150 volt power source at secondary winding 54. A voltage regulator VR1 is also connected between lead 68 and common C, and is effective to limit the voltage on lead 68 to approximately 5 volts peak.

The 60 Hz square wave circuit 62 includes a buffer 70 having its input pin connected to lead 68 and its output pin connected to connecting point A4. Buffer 70 functions to convert the 60 Hz alternating current signal on lead 68 to a 60 Hz square wave signal. This 60 Hz square wave signal is applied through connecting points A4 and B5 to the interrupt pin $\overline{INT}$ of a microcomputer M1.

Microcomputer M1 is a single component 8-bit device. Included therein are an 8-bit CPU (central processing unit), a 1796×8 user ROM (read only memory), a 64×8 RAM (random access read/write memory), 20 I/O (input/output) lines, a clock, and an 8-bit timer/counter. The pins of microcomputer M1 are designated $V_{CC}$, $V_{SS}$, PA0 through PA7, PB0 through PB7, PC0 through PC3, $\overline{INT}$, EXTAL, XTAL, NUM, TIMER, and $\overline{RESET}$. Hereinafter, for brevity, the various input/output ports and their bits, such as port PA bit 0, will be referred to as pins, such as pin PA0.

Reset circuit 64 is connected at one end to lead 68 and at its other end to connecting point A5 and through connecting point B6 to the $\overline{RESET}$ pin of microcomputer M1. Reset circuit 64 includes a rectifier CR2, a buffer 72, and a rectifier CR3 connected in series between lead 68 and connecting point A5. Reset circuit 64 further includes a capacitor C3 connected between the anode of rectifier CR3 and common C, and a capacitor C4 and a resistor R3 connected in parallel with each other between the input of buffer 72 and common C.

When power is initially applied to reset circuit 64, capacitor C4 is completely discharged so that the input, and thus the output, of buffer 72 is initially low. With the output of buffer 72 low, the voltage at the $\overline{RESET}$ pin is low, so that microcomputer M1 is in its reset mode. Capacitor C4 quickly charges through rectifier CR2, causing the input, and thus the output, of buffer 72 to go high. When the output of buffer 72 is high, rectifier CR3 blocks, enabling capacitor C3 to begin to be charged by the 5 volt power source (to be hereinafter described) through an internal pull-up resistance provided between the 5 volt source and the $\overline{RESET}$ pin in microcomputer M1. After a time period sufficient for the 5 volt source to have become stable, capacitor C3 charges sufficiently to make the $\overline{RESET}$ pin high. With the $\overline{RESET}$ pin high, microcomputer M1 is released from its reset mode and enters its run mode. On a momentary power interruption, capacitor C4 quickly discharges through resistor R3, causing the input, and thus the output, of buffer 72 to go low. This low enables capacitor C3 to discharge through rectifier CR3 and buffer 72 and thus causes the RESET pin to go low, which causes microcomputer M1 to enter its reset mode. This reset mode can then only be cleared when power is restored.

Referring again to isolation transformer 26, secondary winding 56 has an open circuit voltage of approximately 20 volts. Secondary winding 56 is connected through a full wave bridge comprising rectifiers CR4, CR5, CR6, and CR7, and through a filter capacitor C5, so as to provide a filtered unidirectional power source of approximately 20 volts. This 20 volt power source is applied to a lead 74 which is connected through connecting point A3 to the spark generating circuit 58, and is also applied to the input of a commercially available regulated power supply 76 which provides a stable 12 volt direct current power source at its output terminal 78.

The output of the 12 volt regulated power supply 76 is connected through a dropping resistor R4 and a capacitor C6 to common C. Capacitor C6 filters the 12 volt output. Connected to the junction 80 between dropping resistor R4 and filter capacitor C6 is the input of a commercially available regulated power supply 82 which provides a stable 5 volt direct current power source at its output terminal 84. A filter capacitor C7 for the 5 volt source is connected between the 5 volt source and common C, and is located physically close to microcomputer M1 as shown in FIG. 1C.

A relay contact check circuit is shown generally at 86 in FIG. 1A. Circuit 86 includes an NPN transistor Q1 having its collector connected through a pull-up resistor R5 to the 5 volt power source and its emitter connected to common C. A resistor R6 is connected between normally-closed contact 38 and the base of transistor Q1. A resistor R7 and a rectifier CR8 are connected in parallel with each other between the base of transistor Q1 and common C. A lead 88 connects the collector of transistor Q1 through connecting points A6 and B7 to pin PB5 of microcomputer M1.

The function of relay contact check circuit 86 is to prove that the normally-open contacts 36 are open when they are required to be open, and closed when they are required to be closed. This function is accomplished by monitoring the normally-closed contacts 38 of the double-throw relay. Specifically, when normally-closed contacts 38 are closed, the normally-open contacts 36 will inherently be open; when normally-closed contacts 38 are open, the normally-open contacts 36 will inherently be closed.

Figure 2:
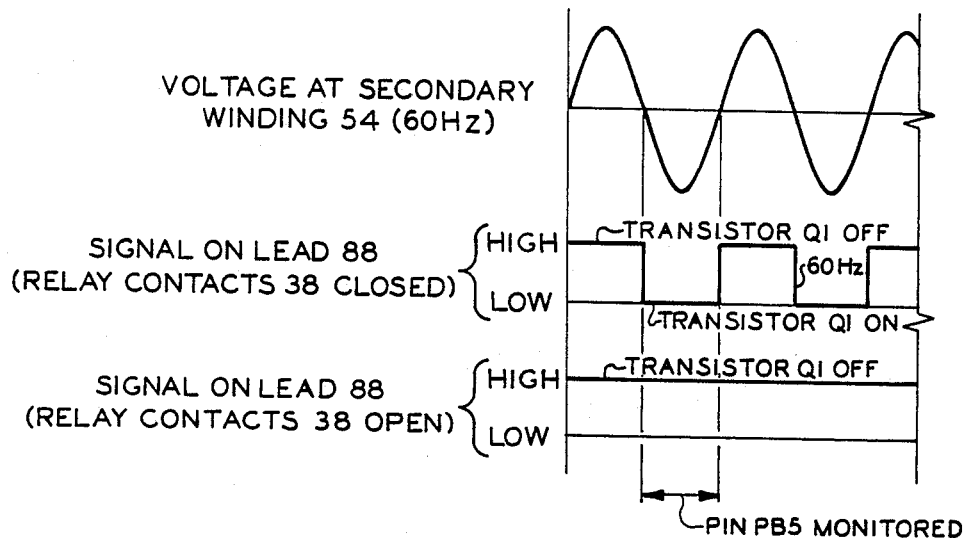
FIG. 2 is a graphical illustration of signals relating to the relay contact check circuit.

When normally-closed contacts 38 are closed, a circuit is completed to the power source at secondary winding 54 of transformer 26, the circuit being: from one end of secondary winding 54 through capacitor C1, to earth ground E, through primary winding 24 of transformer 26, and, in parallel with primary winding 24, through secondary winding 18 of transformer 10, thermostat 20, and pressure switch 22, through closed contacts 38, resistor R6, the base-emitter circuit of transistor Q1, and through chassis common C to the other side of secondary winding 54 of transformer 26. When the end of secondary winding 54 connected to common C is positive, transistor Q1 is biased off. With transistor Q1 turned off, the signal on lead 88 is high. When the polarity of the alternating current power source at secondary winding 54 reverses, transistor Q1 is biased on through the above-described circuit. With transistor Q1 turned on, the signal on lead 88 is low. Thus, as illustrated in FIG. 2, when relay contacts 38 are closed, relay contact check circuit 86 generates a 60 Hz square wave which appears on lead 88. Resistor R6 limits the current flow through the base of transistor Q1 and through rectifier CR8. Rectifier CR8 provides a path for the negative half-cycle current flow so as to protect transistor Q1 and microcomputer M1 from large negative voltages. Resistor R7 is effective to shunt the base so as to limit false turn on of transistor Q1 and to limit voltage at transistor Q1 under open emitter conditions.

When normally-closed contacts 38 are open, transistor Q1 is constantly off so that, as illustrated in FIG. 2, a constant high signal appears on lead 88.

Pin PB5 is monitored once every 16 milliseconds during the entire burner cycle. Specifically, a sub-routine in microcomputer M1 for such monitoring is executed once every line frequency interrupt cycle in the third or fourth quadrant as illustrated in FIG. 2. When the program logic in microcomputer M1 requires that relay contacts 36 be open (which means that relay contacts 38 must be closed), the signal on lead 88 must be the above-described 60 Hz square wave signal, and microcomputer M1 checks for a low signal on pin PB5. The check is for a low signal since this sub-routine is executed in the third or fourth quadrant when the square wave signal on lead 88 is in its low portion. When the program logic requires that relay contacts 36 be closed (which means that relay contacts 38 must be open), the signal on lead 88 must be the above-described constant high signal, and microcomputer M1 checks for a constant high signal on pin PB5. If the monitored signals are not correct, the system locks out. In lockout, all inputs and outputs of microcomputer M1 are in such modes that gas flow and sparking is inhibited.

Referring to FIG. 1B, spark generating circuit 58 includes a voltage step-up transformer 90 having a primary winding 92 and a secondary winding 94. One end of secondary winding 94 is connected to a junction 96 in flame detect circuit 60, and the other end of secondary winding 94 is connected through connecting points A7 to spark electrode 52.

One end of primary winding 92 is connected to common C through the emitter-collector circuit of an NPN transistor Q2. The other end of primary winding 92 is connected through a storage capacitor C8, a current-limiting resistor R8, connecting points A1, and rectifier CR1 to one side of the 150 volt secondary winding 54 of transformer 26. A bleed resistor R9 for capacitor C8 is connected in parallel with series-connected capacitor C8 and primary winding 92.

Also connected in parallel with series-connected capacitor C8 and primary winding 92 is an SCR (silicon controlled rectifier) Q3. The anode of SCR Q3 is connected to a junction 98 between capacitor C8 and resistor R8, and the cathode thereof is connected to a junction 100 between primary winding 92 and the collector of transistor Q2.

The 20 volt filtered unidirectional power source on lead 74 is connected to the gate of SCR Q3 through connecting points A3, a current-limiting resistor R10, and similarly-poled rectifiers CR9 and CR10. A noise-suppressing resistor R11 is connected between the gate and cathode of SCR Q3 to prevent accidental gating.

The collector of an NPN transistor Q4 is connected to a junction 102 between rectifier CR10 and resistor R10, and the emitter thereof is connected to common C. The base of transistor Q4 is connected through a current-limiting resistor R12 and connecting points B3 to pin PB7 of microcomputer M1.

A current-limiting resistor R13 is connected between the base of transistor Q2 and the output of a buffer 104. The input of buffer 104 is connected through a lead 106, a rectifier CR11, a capacitor C9, and connecting points B4 to pin PB6 of microcomputer M1. A pull-up resistor R14 is connected between the 5 volt source and pin PB6. The cathode of a rectifier CR12 is connected to a junction 108 between the anode of rectifier CR11 and one side of capacitor C9, and the anode thereof is connected to common C. A parallel-connected branch comprising a capacitor C10 and a bleed resistor R15 is connected at one end to common C and at the other end to lead 106.

When sparking is not desired, transistors Q2 and Q4 are biased off. Transistor Q2 is biased off by a constant digital low signal on pin PB6, and transistor Q4 is biased off by a constant digital low signal on pin PB7. With transistor Q2 off, SCR Q3 cannot be gated on since there is no complete circuit path in the gating circuit of SCR Q3.

When sparking is desired, transistor Q2 is turned on and transistor Q4 is turned on and off so as to enable charging of capacitor C8 and subsequent discharging of capacitor C8 through SCR Q3 and primary winding 92.

Figure 3:
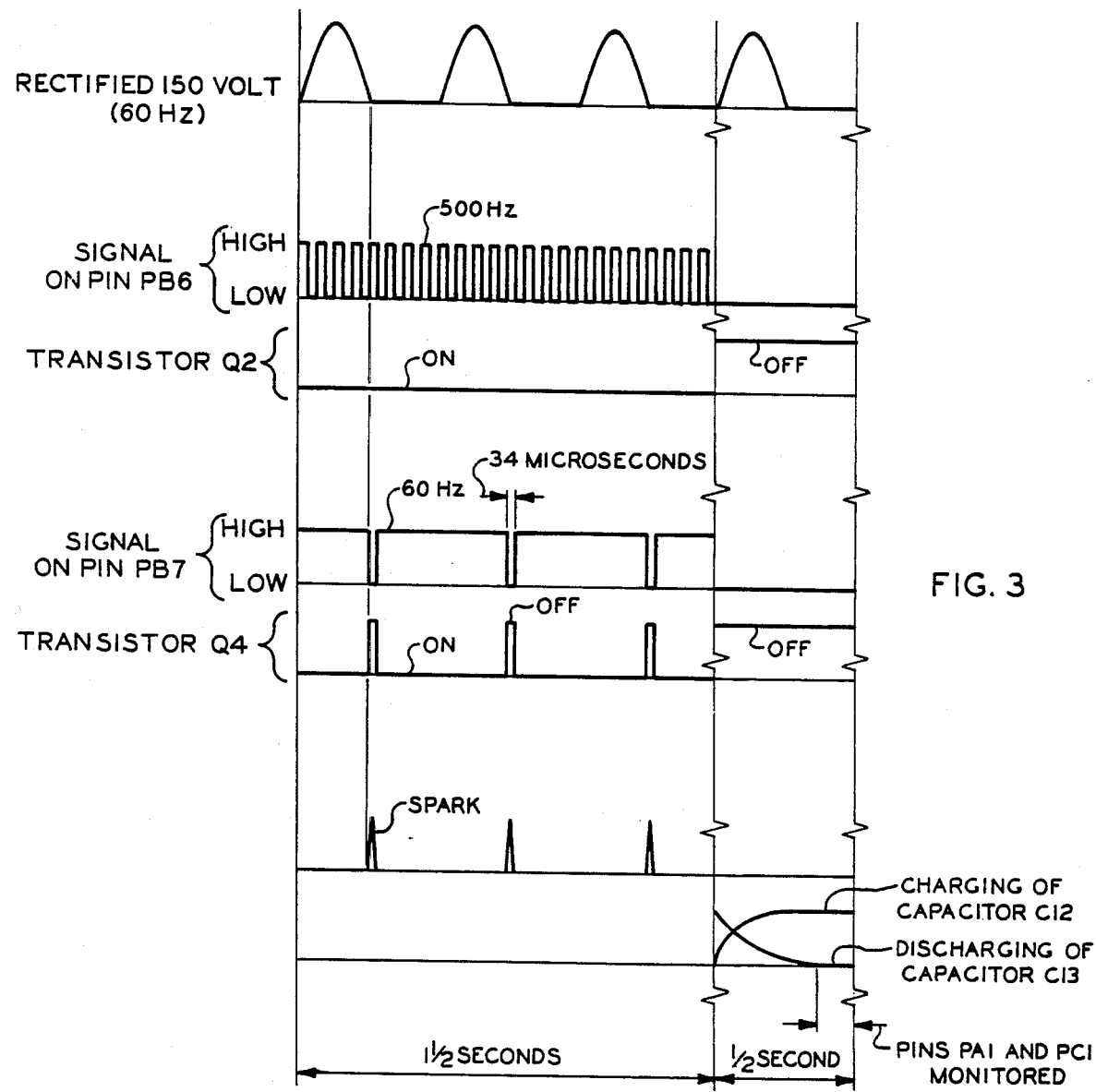
FIG. 3 is a graphical illustration of signals relating to the spark generating and flame detect circuits.

Specifically, referring also to FIG. 3, when sparking is desired, microcomputer M1 provides a 500 Hz signal on pin PB6. When this signal is high, the input, and thus the output, of buffer 104 is high so as to cause transistor Q2 to turn on. Concurrently, capacitor C10 is charged through capacitor C9 and rectifier CR11. When the 500 Hz signal is low, capacitor C10 holds the input of buffer 104 high so as to keep transistor Q2 turned on. Bleed resistor R15 is of sufficiently high resistance to enable capacitor C10 to provide this function. Capacitor C9, which blocks any direct current in the event that pin PB6 should provide a constant low or constant high, is charged to some degree during the high portion of the 500 Hz signal. When the 500 Hz signal is low, capacitor C9 discharges through microcomputer M1 and rectifier CR12.

Concurrently with the initiation of the 500 Hz signal on pin PB6, microcomputer M1 provides a digital high signal on pin PB7. This digital high signal turns on transistor Q4. With transistor Q4 on, it shunts the gate of SCR Q3 so that SCR Q3 is off. With SCR Q3 off and transistor Q2 on, capacitor C8 is charged through resistor R8 by the 150 volt half-wave rectified power source provided by secondary winding 54 through rectifier CR1.

It requires only one half-cycle of the 150 volt half-wave rectified power source to charge C8 to the desired charge level. At the beginning of the third quadrant of the 150 volt source, microcomputer M1 provides a digital low signal on pin PB7. This digital low signal causes transistor Q4 to turn off. With transistor Q4 off, SCR Q3 is gated on, enabling capacitor C8 to rapidly discharge through SCR Q3 and primary winding 92, causing a voltage of approximately 15,000 volts to be induced in secondary winding 94. This high voltage produces a spark between electrode 52 and burner 50.

The digital low signal on pin PB7 has a duration of 34 microseconds. After 34 microseconds, microcomputer M1 again provides a high signal on pin PB7 so as to turn on transistor Q4. With transistor Q4 on, SCR Q3 is again off, enabling capacitor C8 to charge during the next conducting half-cycle of the 150 volt power source. Again, at the beginning of the subsequent third quadrant of the 150 volt source, microcomputer M1 provides a low on pin PB7 so as to enable SCR Q3 to be gated on. With SCR Q3 on, capacitor C8 again discharges to effect sparking between electrode 52 and burner 50. This 60 Hz high-low signal and resulting sparking continue for 1½ seconds. After 1½ seconds, microcomputer M1 again provides a constant low on pin PB7 so as to bias transistor Q4 off. Concurrently, microcomputer M1 terminates the 500 Hz signal on pin PB6 so as to bias transistor Q2 off. Pins PB6 and PB7 remain low for ½ second. This condition of sparking for 1½ seconds and not sparking for ½ seconds repeats until the lockout time, which is the time period during which ignition is attempted, has expired, or flame is detected. As will be hereinafter described, the ½ second non-sparking time period is utilized to detect flame.

A salient feature of spark generating circuit 58 is that it provides multilevel component fault tolerance so as to ensure that sparking is inhibited during times that the combustion chamber is being purged of any combustible mixture. Specifically, capacitor C8 can be charged only when a circuit is completed to common C through capacitor C8, and SCR Q3 is off. As described above, when sparking is not desired, transistor Q4 is off. This enables a voltage to exist at the gate of SCR Q3. Transistor Q2 is off so as to prevent a connection to common C. Thus, if transistor Q2 were inadvertently conducting, SCR Q3 would be gated on. With SCR Q3 on, capacitor C8 could not charge. To enable charging of capacitor C8, transistor Q4 would have to inadvertently become conductive so as to shunt gating of SCR Q3 or both rectifiers CR9 and CR10 would have to fail open so as to prevent gating of SCR Q3, or SCR Q3 would have to become non-conductive due to some failure of SCR Q3 itself. Even if capacitor C8 were to charge, then SCR Q3 would subsequently have to become conductive, at least one cycle after it was non-conductive, so as to enable capacitor C8 to discharge and effect a spark.

Flame detect circuit 60 includes a buffer 110 having its output connected through connecting points B1 to pin PC1 of microcomputer M1 and a buffer 112 having its output connected through connecting points B2 to pin PA1. A pull-up resistor R16 is connected between the 5 volt source and the input of buffer 110, and a pull-up resistor R17 is connected between the 5 volt source and the input of buffer 112. A resistor R18 is connected between the input of buffer 110 and a junction 114, and a resistor R19 is connected between the input of buffer 112 and junction 114. Connected in parallel between the 5 volt source and junction 114 are capacitors C11 and C12, and a resistor R20. A capacitor C13 is connected between connecting point A2 and junction 96, and an inductor L1 is connected between junctions 96 and 114.

During the previously-described 1½ second time period in which sparks are generated, microcomputer M1 does not monitor flame detect circuit 60. During this time period, capacitor C13 effectively grounds the high voltage transformer secondary winding 94 in that its impedance to the high frequency spark pulses is relatively low. Inductor L1 blocks noise due to the sparks, and capacitor C11 suppresses any noise that may pass through inductor L1.

When the 1½ second time period expires, and if burner flame exists, capacitor C12 is charged by the 150 volt source at secondary winding 54, the circuit being: from one end of winding 54 to common C, through the 5 volt source, capacitor C12, inductor L1, secondary winding 94, electrode 52, the burner flame, burner 50, earth ground E, and capacitor C1 and resistor R1 to the other end of winding 54. Due to flame rectification, less current flows through the above described circuit when the polarity of winding 54 reverses. During the reverse polarity, capacitor C12 maintains its charge. Therefore, when burner flame exists, capacitor C12 is charged sufficiently to cause junction 114 to become negative. The negative voltage at junction 114 causes the voltages on the inputs of buffers 110 and 112 to become sufficiently low so that their output signals become low. If burner flame does not exist, the high impedance of capacitor C13 prevents the required charging of capacitor C12. Capacitor C13 is charged during the 1½ second sparking time period. Depending on the effectiveness of capacitor C11 and inductor L1 in filtering noise caused by sparking, capacitor C12 may also be charged to some degree. Therefore, microcomputer M1 is programmed to delay monitoring of pins PA1 and PC1 for a short time so as to allow capacitor C13 to discharge and to allow capacitor C12 to charge in response to flame as described above. Referring to FIG. 3, near the end of the ½ second time period following the 1½ second sparking time period, when capacitor C13 is discharged and capacitor C12 is properly charged, and spark generating circuit 58 is inhibited, microcomputer M1 monitors pins PA1 and PC1.

When flame exists, the outputs of buffers 110 and 112, and thus the signals on pins PC1 and PA1, respectively, are low. If flame does not exist, the outputs of buffers 110 and 112, and thus the signals on pins PC1 and PA1, respectively, are high.

Microcomputer M1 is programmed to require that the signals on pins PA1 and PC1 always be the same with respect to each other. That is to say, they must both be high or both be low. If they are not the same, the control enters into lockout. It is believed that the use of two isolated flame detent channels in flame detect circuit 60, in conjunction with two independent ports in microcomputer M1, enhances the safety of the system.

Referring to FIG. 1C, shown generally at 116 is a relay driver circuit for controlling operation of relay winding 40. As previously described, relay winding 40 controls operation of relay contacts 36 and 38 of FIG. 1A.

Relay winding 40 is connected at one end to the 12 volt power source through the emitter-collector circuits of PNP transistors Q5 and Q6, and at its other end to common C through a rectifier CR13 and the emitter-collector circuit of an NPN transistor Q7. A rectifier CR14 is connected across relay winding 40 to suppress any back EMF generated by relay winding 40, thereby protecting transistors Q5, Q6, and Q7 from any high voltage or high current due to such EMF generation. To effect energizing of relay winding 40, all three transistors Q5, Q6, and Q7 must be conducting.

A resistor R21 is connected between the 12 volt source and the base of transistor Q5 and functions to bias transistor Q5 off. The base of transistor Q5 is also connected through a resistor R22 and a voltage regulator VR2 to pin PA0 of microcomputer M1. When conduction of transistor Q5 is desired, microcomputer M1 pulls pin PA0 low; when conduction is not desired, microcomputer pin PA0 is high. Resistor R22 limits the current that microcomputer M1 must sink. Regulator VR2 regulates at approximately 8 volts so as to prevent latch-up on the micro-computer pin PA0.

Similarly, with regard to transistor Q6, a resistor R23 is connected between the 12 volt source and the base of transistor Q6, and the base thereof is also connected through a resistor R24 and a voltage regulator VR3 to pin PC2 of microcomputer M1. When conduction of transistor Q6 is desired, microcomputer M1 pulls pin PC2 low; when conduction is not desired, pin PC2 is high.

The base of transistor Q7 is connected to pin PC0 of microcomputer M1 through a resistor R25, a buffer 118, a rectifier CR15, and a capacitor C14. A pull-up resistor R26 is connected between the 5 volt source and pin PC0. A parallel-connected capacitor C15 and resistor R27 are connected between the input of buffer 118 and common C. A rectifier CR16 is connected between common C and the junction 120 between capacitor C14 and rectifier CR15.

When conduction of transistor Q7 is not desired, microcomputer M1 provides a constant digital high signal at pin PC0. When the constant high exists, capacitor C14 blocks the signal and capacitor C15 is discharged, making the input of buffer 118 low. With the input of buffer 118 low, the output thereof is low and transistor Q7 is therefore biased off. It is noted that a constant digital low signal at pin PC0 would also prevent conduction of transistor Q7. When conduction of transistor Q7 is desired, microcomputer M1 provides a high frequency digital signal of approximately 500 Hz at pin PC0. When the signal first goes low, capacitor C14 discharges through microcomputer M1 and rectifier CR16. The input to buffer 118 remains low. When the signal goes high, capacitor C15 is charged by the 5 volt source through resistor R26, capacitor C14, and rectifier CR15 to a sufficiently high voltage to cause the input, and thus the output, of buffer 118 to go high. With the output of buffer 118 high, transistor Q7 is biased on. When the 500 Hz signal goes low, capacitor C15 begins to discharge through resistor R27. The discharge time constant is sufficiently long to keep the input of buffer 118 high and thus to keep transistor Q7 biased on for the duration of the low portion of the 500 Hz signal. Also, when the 500 Hz signal goes low, capacitor C14 discharges through microcomputer M1 and rectifier CR16.

It should be noted that the use of the three transistors Q5, Q6, and Q7 instead of just one, enhances the safety of the system in that all three must conduct in order to effect energizing of relay winding 40. It is believed extremely unlikely that a microcomputer malfunction could develop so as to cause all three transistors Q5, Q6, and Q7 to inadvertently conduct. For example, transistors Q5 and Q6 are controlled by two different ports. Therefore, a single port failure could allow only one of transistors Q5 and Q6 to conduct. Also, transistors Q6 and Q7 are controlled by diverse signals at a single port. It is believed extremely unlikely that any malfunction of microcomputer M1 could cause such diverse signals to develop at different bits of a single port. It should also be noted that the appearance of a constant high or constant low signal on all bits of the P ports, due to the microcomputer malfunction, would result in a safe condition. Specifically, if all bits were high, all three transistors Q5, Q6, and Q7 would be off; if all bits were low, transistor Q7 would be off.

To determine that transistors Q5, Q6, and Q7 are operating properly, they are checked by microcomputer M1 at the beginning of each burner cycle.

A checking circuit for transistor Q5 and Q6 includes resistors R28 and R29 which are series-connected between common C and the junction 122 between the collector of transistor Q6 and relay winding 40. The junction 124 between resistors R28 and R29 is connected to pin PB2 of microcomputer M1. To check transistors Q5 and Q6, microcomputer M1 biases one of transistors Q5 and Q6 on and monitors the signal on pin PB2. Then microcomputer M1 biases the other of transistors Q5 and Q6 on and monitors the signal on pin PB2. Microcomputer M1 then reverses the order of biasing transistors Q5 and Q6 on and again monitors the signal. Finally, microcomputer M1 biases both transistors Q5 and Q6 on at the same time and monitors the signal on pin PB2. The signal on pin PB2 must be low when only one of transistors Q5 and Q6 is on and must be high when both transistors Q5 and Q6 are on. If the signal is not correct, the system enters lockout.

A checking circuit for transistor Q7 includes resistors R30, R31, and R32 which are series-connected between the 12 volt source and common C. The junction 126 between resistors R30 and R31 is connected to the collector of transistor Q7, and the junction 128 between resistors R31 and R32 is connected to pin PC3 of microcomputer M1. To check transistor Q7, microcomputer M1 biases transistor Q7 on and monitors the signal on pin PC3. With transistor Q7 on, the signal must be low; with transistor Q7 off, the signal must be high. If the signal is not correct, the system enters lockout. It is noted that rectifer CR13 blocks the check voltage for transistor Q7 so that transistors Q5 and Q6 can be checked independently from transistor Q7.

Referring to microcomputer M1 in FIG. 1C, pin $V_{CC}$ is connected to the 5 volt power source and functions as the main power supply input to micrcomputer M1. A capacitor C16 is connected between pin $V_{CC}$ and common C and functions to remove any high frequency noise from the 5 volt power source. Pin $V_{SS}$ is connected to common C and functions as the connection of microcomputer M1 to common C potential.

The timing element for the on-chip clock oscillator circuit comprises a capacitor C17 connected between pin XTAL and common C, a capacitor C18 connected between pin EXTAL and common C, and an inductor L2 connected across pins XTAL and EXTAL. The values of these components are such that the on-chip clock oscillator circuit provides an instruction time of approximately 2 microseconds.

An LED (light emitting diode) 130 and a resistor R33 are connected in series between the 5 volt source and pin PB1 of microcomputer M1. When the system is operating properly, pin PB1 is high so that LED 130 is off. If various failures of microcomputer M1 or its related circuitry should occur, pin PB1 provides a ½ Hz signal, causing LED 130 to flash on and off at ½ Hz; if various failures in system function should occur, pin PB1 provides a constant low, causing LED 130 to be constantly on.

Pin TIMER is connected to the 5 volt source, and pin NUM is connected to common C.

A capacitor C19, connected between pin PB7 and common C, and an capacitor C20, connected between pin $\overline{RESET}$ and common C, function to remove any high frequency noise that might otherwise appear at pins PB7 and $\overline{RESET}$, respectively.

Pre-purge time, lockout time, and control mode are selected by the appropriate connection and non-connection of resistors R34 through R45. Resistors R34 through R39 are connectable between pins PA2 through PA7 and common C, and resistors R40 through R45 are connectable between pins PA2 through PA7 and the 5 volt source.

For example, with the specific connection and non-connection of resistors R34 through R45 illustrated in FIG. 1C, the connection of resistor R41 and the non-connection of resistor R35 establishes a pre-purge time of 30 seconds. The connection of resistors R44 and R45 and the non-connection of resistors R38 and R39 establishes a lockout time of 4 seconds. The connection of resistors R36 and R43 and the non-connection of resistors R37 and R42 establishes that the control mode is to be direct ignition. Other control modes could be other types of direct ignition and various proven-pilot systems. Such other control modes would require some changes in hardware, but they would utilize the same microcomputer M1.

Resistor R34 is connectable to establish even parity with resistors R35 through R39, and resistor R40 is connectable to establish even parity with resistors R41 through R45. In the illustration, resistor R34 is connected since resistor R36 is the only resistor of resistors R35 through R39 that is connected; resistor R40 is not connected since four resistors R41, R43, R44, and R45 are connected.

Microcomputer M1 is inherently sensitive to electrical noise, particularly to the electrical noise radiated from spark transformer 90. A salient feature of the present invention is a program sub-routine in the logic of microcomputer M1 which negates the effect of such noise.

Figure 4:
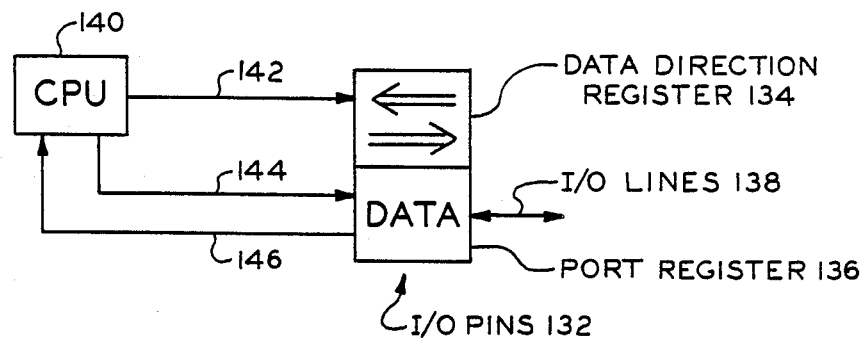
FIG. 4 is a simplified block diagram of a portion of the microcomputer chip.

Specifically, referring to FIG. 4, each of the I/O pins 132, which correspond to pins PA0 through PA7, PB0 through PB7, and PC0 through PC3, have associated therewith a data direction register 134 and a port register 136. The data direction register 134 establishes the status, input or output, of each of the I/O pins 132. The port register 136 stores the data transmitted through I/O lines 138 to or from each of the I/O pins 132. The CPU 140 writes date to the data direction register 134 through line 142 so as to define whether a particular one of I/O pins 132 is to be an output pin or an input pin. If a particular one of I/O pines 132 is defined as an output pin, data from CPU 140 is written through line 144 to port register 136; if a particular one of I/O pins 132 is defined as an input pin, data in port register 136 is read by CPU 140 through line 146.

Electrical noise can change the defined input/output status of one or more of I/O pins 132. That is to say, noise can affect data direction register 134 so as to change a defined input status to an output status or a defined output status to an input status. Also, noise can affect port register 136 so as to change the data therein. Obviously, such changes in defined status in data direction register 134 and/or data in port register 136, if not corrected, could cause erroneous system operation.

Figure 5:
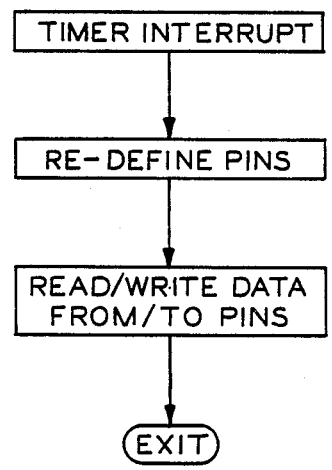
FIG. 5 is a simplified flow chart of the program sub-routine for re-defining the I/O ports.

To negate the above described effect of electrical noise, the logic of microcomputer M1 includes a subroutine illustrated in FIG. 5. A 1000 Hz timer interrupt is provided. At all except three of the interrupts in a 16-millisecond time period, CPU 140 re-defines the I/O pins 132. That is to say, CPU 140 again writes data to the data direction register 134 to again define the status of each of the I/O pins 132. After re-definition, CPU 140 then again reads the data from the particular ones of I/O pins 132 which are re-defined as inputs, and again writes the data to the particular ones of I/O pins 132 which are re-defined as outputs.

The effect of any erroneous data that may appear in data direction register 134 or port register 136 between the timer interrupts is negated by other means, such as by various debounce sub-routines and multiple sampling.

It might be noted that the three timer interrupts in a 16-millisecond time period which are not utilized to re-define the pins 132 are utilized for executing sub-routines relating to spark generating circuit 58, flame detect circuit 60, and relay contact check circuit 86.

While software re-definition of the I/O pins 132 is effective to negate the effect of electrical noise, it is to be noted that various hardware means are utilized to reduce the generation of electrical noise. For example, a 60 Hz. spark generating circuit is used herein rather than a high-frequency oscillator type. Also, the printed circuit board on which the circuit components are installed is preferably as totally covered as possible, on the component mounting side of the board, with copper. This copper covering, which provides a ground plane, is connected to common C at a circuit location away from microcomputer M1 and near the 5 volt regulated power supply 82. This ground plane reduces the coupling of noise to microcomputer M1 by shielding and effectively forming small capacitors with the circuit component leads. Also, spark transformer 90 is physically mounted as far away as possible from microcomputer M1. Also, noise filtering capacitors C16, C19, and C20 are physically mounted as near as possible to microcomputer M1. Also, the electrical "runs" on the circuit board are as short as possible.

The following components have been found to be suitable for use in the system described herein.

| COMPONENT | TYPE |
| --- | --- |
| M1 | 6805 Microcomputer |
| L1 | 1000 Micro-henries |
| L2 | 100 Micro-henries |
| VR1 | 1N5231B |
| VR2, VR3 | 1N5998 |
| 12 Volt Regulated Power Supply 76 | 7812 |
| 5 Volt Regulated Power Supply | 7805 |
| Buffer 70, 72, 104, 110, 112, 118 | 4050 |
| Q1, Q4, Q7 | MPS6530 |
| Q2 | 2N6515 |
| Q3 | C106B |
| Q5, Q6 | MPS6523 |
| CR1, CR2, CR4 through CR7, CR9, CR10, CR13, CR14 | 1N4004 |
| CR3, CR8, CR11, CR12, CR15, CR16 | 1N4150 |
| C1, C4 | .047 Mfd. |
| C2, C11 | 680 Pfd. |
| C3, C7 | 2.2 Mfd. |
| C5 | 470 Mfd. |
| C6 | 47 Mfd. |
| C8 | 1 Mfd. |
| C9, C14, C19, C20 | .01 Mfd. |
| C10, C15 | .0047 Mfd. |
| C12 | .022 Mfd. |
| C13 | 100 Pfd. |
| C16 | .1 Mfd. |
| C17, C18 | 120 Pfd. |
| R1, R9 | 5.1 M |
| R2, R3, R15, R18, R19, R27 | 10 M |
| R4 | 10 ohms |
| R5, R11, R14, R21, R23, R29, R31 | 10k |
| R6 | 3 M |
| R7 | 100 k |
| R8 | 750 ohms |

-continued

| COMPONENT | TYPE |
| --- | --- |
| R10 | 2.2 k |
| R12 | 1k |
| R13, R25 | 4.7 k |
| R16, R17, R20 | 22 M |
| R22, R24 | 3.9 k |
| R26 | 5.1 k |
| R28, R30, R32 | 20 k |
| R33 | 150 ohms |
| R34 through R45 | 220 ohms |

While the invention has been illustrated and described in detail in the drawings and foregoing description, it will be recognized that many changes and modifications will occur to those skilled in art. It is therefore intended, by the appended claims, to cover any such changes and modifications as fall within the true spirit and scope of the invention.

We claim:

1. In a gas burner control system,
a burner;
electrically operated valve means connected fluidically in series with said burner;
first circuit means for controlling energizing of said valve means;
second circuit means for producing sparks at said burner; third circuit means for detecting flame at said burner; and
a microcomputer connected through input/output pins to said first, second, and third circuit means for controlling operation thereof,
said microcomputer including a central processing unit for defining a desired status, input or output, of said pins, by writing data to said pins,
each of said pins having associated therewith a data direction register which, in response to said defining by said central processing unit, establishes said desired status,
said microcomputer including program means for negating the effect of a change in said established status when said change is caused by means other than a change in said defining by said central processing unit,
said program means comprising a program sub-routine for causing said central processing unit to periodically re-define the status of said each of said pins to said desired status.

2. In a gas burner control system,
a burner;
electrically operated valve means connected fluidically in series with said burner;
a relay for controlling energizing of said valve means;
a relay driver circuit for controlling operation of said relay;
a spark generating circuit for producing sparks at said burner;
a flame detect circuit for detecting flame at said burner;
a microcomputer connected through input/output pins to said relay driver circuit, said spark generating circuit, and said flame detect circuit for controlling operation thereof,
said microcomputer including program means for defining the status of said input/output pins and for periodically re-defining said status, said relay being a double-throw relay comprising a set of normally-open contacts and a set of normally-closed contacts, said normally-open contacts being effective to control energizing of said valve means; and a relay contact check circuit connected to said microcomputer, said relay contact check circuit including said normally-closed contacts and effective, in response to open and closed positions of said normally-closed contacts, for monitoring whether said normally-open contacts are open or closed.

3. In a gas burner control system, a burner;

electrically operated valve means connected fluidically in series with said burner;

a relay for controlling energizing of said valve means;

a relay driver circuit for controlling operation of said relay;

a spark generating circuit for producing sparks at said burner;

a flame detect circuit for detecting flame at said burner; and a microcomputer connected through input/output pins to said relay drive circuit, said spark generating circuit, and said flame detect circuit for controlling operation thereof, said microcomputer including program means for defining the status of said input/output pins and for periodically re-defining said status, said spark generating circuit including a storage capacitor, a gate-controlled solid state switch, a voltage step-up transformer having a primary winding connected in series with said capacitor and a secondary winding connected to a spark electrode at said burner, and first and second solid state switches, wherein said gate-controlled switch is connected in parallel with said series-connected capacitor and primary winding, said first switch is connected in parallel with a gate circuit of said gate-controlled switch, and said second switch is connected in series with said gate-controlled switch and said series-connected capacitor and primary winding across a power source, so that said capacitor is charged by said power source when said first swich is conductive and said second switch is conductive, and is subsequently discharged through said primary winding and said gate-controlled switch when said first switch is subsequently. non-conductive and said second switch is conductive.

4. The control system claimed in claim 3 wherein a spark is generated at said spark electrode when said capacitor discharges, and wherein said microcomputer controls conduction and non-conduction of said first and second switches so as to provide a cyclically re-occurring finite sparking time period followed by a finite non-sparking time period.

5. The control system claimed in claim 4 wherein said flame detent circuit is effective to provide signals to said microcomputer indicative of presence and absence of flame at said burner, and wherein said microcomputer monitors said signals during said finite non-sparking time period.

* * * * *